US011269660B2

(12) United States Patent
Yueh

(10) Patent No.: US 11,269,660 B2
(45) Date of Patent: Mar. 8, 2022

(54) METHODS AND SYSTEMS FOR INTEGRATED DEVELOPMENT ENVIRONMENT EDITOR SUPPORT WITH A SINGLE CODE BASE

(71) Applicant: ASG Technologies Group, Inc., Naples, FL (US)

(72) Inventor: Chien Tseng Yueh, Scottsdale, AZ (US)

(73) Assignee: ASG Technologies Group, Inc., Naples, FL (US)

(*) Notice: Subject to any disclaimer, the term of this patent is extended or adjusted under 35 U.S.C. 154(b) by 0 days.

(21) Appl. No.: 16/883,921

(22) Filed: May 26, 2020

(65) Prior Publication Data

US 2021/0117210 A1 Apr. 22, 2021

Related U.S. Application Data

(60) Provisional application No. 62/923,151, filed on Oct. 18, 2019.

(51) Int. Cl.
*G06F 9/445* (2018.01)
*G06F 3/0482* (2013.01)

(52) U.S. Cl.
CPC ........ *G06F 9/44526* (2013.01); *G06F 3/0482* (2013.01)

(58) Field of Classification Search
CPC ............................ G06F 9/44526; G06F 3/0482
See application file for complete search history.

(56) References Cited

U.S. PATENT DOCUMENTS

| 5,321,610 A | 6/1994 | Breslin |
| 5,528,263 A | 6/1996 | Platzker et al. |

(Continued)

FOREIGN PATENT DOCUMENTS

| EP | 3430529 A1 | 1/2019 |
| EP | 3714604 A1 | 9/2020 |

(Continued)

OTHER PUBLICATIONS

"International Search Report" and "Written Opinion of the International Searching Authority," Patent Cooperation Treaty Application No. PCT/US2017/022295, dated Jun. 1, 2017, 9 pages.

(Continued)

*Primary Examiner* — Tadesse Hailu
(74) *Attorney, Agent, or Firm* — Carr & Ferrell LLP

(57) ABSTRACT

Systems and methods for discovering a unique identifier for an integrated development environment editor for receiving a single code base with a same functionality from a plug-in are disclosed herein. Exemplary implementations may include: accessing an integrated development environment's plug-in registry using publicly available tools and publicly available published information; identifying a unique identifier for the integrated development environment's editor using the plug-in registry; adding the unique identifier for the integrated development environment editor to a plug-in; and repeating the process for other integrated development environment editors, allowing functions developed for the integrated development environment editor to be available in the other integrated development environments.

20 Claims, 15 Drawing Sheets

(56) References Cited

U.S. PATENT DOCUMENTS

| | | |
|---|---|---|
| 5,742,285 A | 4/1998 | Ueda |
| 6,069,957 A | 5/2000 | Richards |
| 6,208,345 B1 | 3/2001 | Sheard et al. |
| 6,331,855 B1 | 12/2001 | Schauser |
| 6,574,321 B1 | 6/2003 | Cox et al. |
| 6,597,363 B1 | 7/2003 | Duluk |
| 6,950,825 B2 | 9/2005 | Chang et al. |
| 7,073,164 B1 | 7/2006 | Knowles |
| 7,937,665 B1 | 5/2011 | Vazquez et al. |
| 8,078,731 B1 | 12/2011 | Bruder et al. |
| 8,667,456 B1 * | 3/2014 | Czymontek ............ G06F 8/315 717/100 |
| 8,745,011 B2 | 6/2014 | Kishi |
| 9,032,076 B2 | 5/2015 | Buehler et al. |
| 9,053,295 B1 * | 6/2015 | Wick ........................ G06F 8/35 |
| 9,213,707 B2 | 12/2015 | Conner |
| 9,483,537 B1 | 11/2016 | Peters et al. |
| 9,621,428 B1 | 4/2017 | Lev et al. |
| 9,910,655 B1 | 3/2018 | Ranganathan et al. |
| 10,162,624 B1 | 12/2018 | Moturu et al. |
| 10,181,059 B1 | 1/2019 | Brewton et al. |
| 10,318,762 B1 | 6/2019 | Buckingham et al. |
| 10,348,505 B1 | 7/2019 | Crawforth et al. |
| 10,812,611 B2 | 10/2020 | Bennet et al. |
| 10,877,740 B2 | 12/2020 | Bennet et al. |
| 11,055,067 B2 | 7/2021 | Thangaraj et al. |
| 11,057,500 B2 | 7/2021 | Aragoón et al. |
| 11,172,042 B2 | 11/2021 | Bennet et al. |
| 2002/0103731 A1 | 8/2002 | Barnard et al. |
| 2002/0184610 A1 * | 12/2002 | Chong ...................... G06F 8/20 717/109 |
| 2002/0196277 A1 | 12/2002 | Bushey et al. |
| 2003/0046401 A1 | 3/2003 | Abbott et al. |
| 2003/0079052 A1 * | 4/2003 | Kushnirskiy ....... G06F 9/44521 719/328 |
| 2004/0003119 A1 | 1/2004 | Munir et al. |
| 2004/0003371 A1 * | 1/2004 | Coulthard ................ G06F 8/24 717/101 |
| 2004/0078373 A1 | 4/2004 | Ghoneimy et al. |
| 2004/0128001 A1 | 7/2004 | Levin et al. |
| 2004/0153994 A1 | 8/2004 | Bates et al. |
| 2004/0177323 A1 | 9/2004 | Kaasila et al. |
| 2004/0267749 A1 | 12/2004 | Bhat et al. |
| 2005/0038764 A1 | 2/2005 | Minsky et al. |
| 2005/0065845 A1 * | 3/2005 | DeAngelis ......... G06Q 30/0201 705/14.4 |
| 2005/0235258 A1 * | 10/2005 | Wason ...................... G06F 8/00 717/110 |
| 2005/0278695 A1 * | 12/2005 | Synovic .................... G06F 8/33 717/112 |
| 2006/0031854 A1 | 2/2006 | Godwin |
| 2006/0036448 A1 | 2/2006 | Haynie et al. |
| 2006/0036941 A1 * | 2/2006 | Neil ........................ G06F 9/451 715/234 |
| 2006/0039466 A1 | 2/2006 | Emerson et al. |
| 2006/0111888 A1 | 5/2006 | Hiew et al. |
| 2006/0184925 A1 | 8/2006 | Ficatier et al. |
| 2006/0251047 A1 * | 11/2006 | Shenfield ................ H04L 67/10 370/351 |
| 2006/0271528 A1 | 11/2006 | Gorelik |
| 2007/0016624 A1 | 1/2007 | Powers et al. |
| 2007/0028286 A1 | 2/2007 | Greene et al. |
| 2007/0156764 A1 | 7/2007 | O'Connell et al. |
| 2007/0180444 A1 | 8/2007 | Hoover et al. |
| 2007/0198450 A1 | 8/2007 | Khalsa |
| 2007/0208685 A1 | 9/2007 | Blumenau |
| 2007/0266394 A1 | 11/2007 | Odent et al. |
| 2007/0294406 A1 | 12/2007 | Suer et al. |
| 2008/0109292 A1 | 5/2008 | Moore |
| 2008/0126932 A1 | 5/2008 | Elad et al. |
| 2008/0209390 A1 | 8/2008 | Dutta et al. |
| 2008/0229303 A1 | 9/2008 | Carteri et al. |
| 2008/0281727 A1 | 11/2008 | Moss |
| 2009/0024660 A1 | 1/2009 | Borgsmidt et al. |
| 2009/0083306 A1 | 3/2009 | Sichi et al. |
| 2009/0094112 A1 | 4/2009 | Cesarini et al. |
| 2009/0124387 A1 | 5/2009 | Perlman et al. |
| 2009/0249446 A1 | 10/2009 | Jenkins et al. |
| 2010/0106560 A1 | 4/2010 | Li et al. |
| 2010/0114628 A1 | 5/2010 | Adler et al. |
| 2010/0131857 A1 | 5/2010 | Prigge |
| 2010/0169265 A1 | 7/2010 | Ristock et al. |
| 2010/0225658 A1 | 9/2010 | Coleman |
| 2010/0226441 A1 | 9/2010 | Tung et al. |
| 2010/0231599 A1 | 9/2010 | Tung et al. |
| 2010/0245563 A1 | 9/2010 | Golovchinsky et al. |
| 2010/0250497 A1 | 9/2010 | Redlich et al. |
| 2010/0274815 A1 | 10/2010 | Vanasco |
| 2011/0004564 A1 | 1/2011 | Rolia et al. |
| 2011/0029947 A1 | 2/2011 | Markovic |
| 2011/0107298 A1 * | 5/2011 | Sebastian ............ G06F 11/3664 717/113 |
| 2011/0107309 A1 * | 5/2011 | Baron ...................... G06F 8/33 717/128 |
| 2011/0107313 A1 * | 5/2011 | Baron ................ G06F 11/3612 717/130 |
| 2011/0246904 A1 | 10/2011 | Pinto et al. |
| 2011/0276636 A1 | 11/2011 | Cheng et al. |
| 2012/0072509 A1 | 3/2012 | Booth |
| 2012/0075333 A1 | 3/2012 | Chen et al. |
| 2012/0310875 A1 | 12/2012 | Prahlad et al. |
| 2012/0324358 A1 | 12/2012 | Jooste |
| 2013/0031158 A1 | 1/2013 | Salsburg |
| 2013/0117662 A1 | 5/2013 | Shan et al. |
| 2013/0151557 A1 | 6/2013 | Shanken et al. |
| 2013/0275475 A1 | 10/2013 | Ahlborn |
| 2013/0332423 A1 | 12/2013 | Puri et al. |
| 2014/0032875 A1 | 1/2014 | Butler |
| 2014/0047011 A1 | 2/2014 | Lahav et al. |
| 2014/0047413 A1 | 2/2014 | Sheive et al. |
| 2014/0075407 A1 | 3/2014 | Donis et al. |
| 2014/0089388 A1 | 3/2014 | Curry et al. |
| 2014/0114907 A1 | 4/2014 | Kozina et al. |
| 2014/0114962 A1 | 4/2014 | Rosenburg et al. |
| 2014/0207575 A1 | 7/2014 | Freed-Finnegan et al. |
| 2014/0245199 A1 | 8/2014 | Belotti et al. |
| 2014/0282453 A1 | 9/2014 | O'Rourke et al. |
| 2014/0288923 A1 | 9/2014 | Marian et al. |
| 2014/0288945 A1 | 9/2014 | Boerner et al. |
| 2014/0380105 A1 | 12/2014 | Michel et al. |
| 2015/0006543 A1 | 1/2015 | Jin et al. |
| 2015/0012478 A1 | 1/2015 | Mohammad et al. |
| 2015/0046930 A1 | 2/2015 | Phadke |
| 2015/0127660 A1 | 5/2015 | Zilberberg et al. |
| 2015/0293764 A1 | 10/2015 | Visvanathan |
| 2015/0379303 A1 | 12/2015 | LaFever et al. |
| 2016/0026968 A1 | 1/2016 | Fan et al. |
| 2016/0034260 A1 | 2/2016 | Ristock et al. |
| 2016/0034571 A1 | 2/2016 | Setayesh et al. |
| 2016/0044380 A1 | 2/2016 | Barrett |
| 2016/0070541 A1 | 3/2016 | Lee et al. |
| 2016/0117159 A1 | 4/2016 | Balko |
| 2016/0140204 A1 | 5/2016 | Brown et al. |
| 2016/0253340 A1 | 9/2016 | Barth et al. |
| 2016/0267082 A1 | 9/2016 | Wong et al. |
| 2016/0275439 A1 | 9/2016 | Avats |
| 2016/0283200 A1 * | 9/2016 | Standley ................ G06F 9/5072 |
| 2016/0299933 A1 | 10/2016 | Fillipi et al. |
| 2016/0359711 A1 | 12/2016 | Deen et al. |
| 2017/0039041 A1 * | 2/2017 | Bommireddi ............ G06F 8/34 |
| 2017/0068395 A1 | 3/2017 | Massoudi |
| 2017/0118284 A1 | 4/2017 | Chen et al. |
| 2017/0123751 A1 | 5/2017 | Sigurdsson et al. |
| 2017/0154026 A1 | 6/2017 | Gong et al. |
| 2017/0180284 A1 | 6/2017 | Smullen et al. |
| 2017/0199936 A1 | 7/2017 | Steelberg et al. |
| 2017/0228119 A1 | 8/2017 | Hosbettu et al. |
| 2017/0269972 A1 | 9/2017 | Hosabettu et al. |
| 2017/0270022 A1 | 9/2017 | Moresmau et al. |
| 2017/0339564 A1 | 11/2017 | Momchilov et al. |
| 2017/0344227 A1 * | 11/2017 | Stoicov ................ G06F 16/168 |
| 2017/0357814 A1 | 12/2017 | Mahaffey et al. |
| 2018/0089005 A1 | 3/2018 | Green |

(56) References Cited

U.S. PATENT DOCUMENTS

| | | | |
|---|---|---|---|
| 2018/0129497 A1* | 5/2018 | Biddle | G06F 11/3636 |
| 2018/0167426 A1 | 6/2018 | Sigurdsson et al. | |
| 2018/0174104 A1 | 6/2018 | Schikora et al. | |
| 2018/0191761 A1 | 7/2018 | Lee et al. | |
| 2018/0197123 A1 | 7/2018 | Parimelazhagan et al. | |
| 2018/0322396 A1 | 11/2018 | Ahuja-Cogny et al. | |
| 2018/0367506 A1 | 12/2018 | Ford et al. | |
| 2019/0129734 A1* | 5/2019 | Yang | G06F 8/20 |
| 2019/0158630 A1 | 5/2019 | Aragón et al. | |
| 2019/0205111 A1 | 7/2019 | Bennet et al. | |
| 2019/0208031 A1 | 7/2019 | Bennet et al. | |
| 2019/0238467 A1 | 8/2019 | Guan et al. | |
| 2019/0238688 A1 | 8/2019 | Bermundo et al. | |
| 2019/0243742 A1 | 8/2019 | Natari | |
| 2019/0332357 A1 | 10/2019 | Reddy | |
| 2019/0369969 A1* | 12/2019 | Donohoe | G06F 9/455 |
| 2020/0042648 A1* | 2/2020 | Rao | G06F 8/20 |
| 2020/0050983 A1 | 2/2020 | Balasubramanian et al. | |
| 2020/0348964 A1 | 11/2020 | Anand et al. | |
| 2020/0356365 A1* | 11/2020 | Pezaris | G06F 8/71 |
| 2020/0409665 A1 | 12/2020 | Swaminathan et al. | |
| 2021/0019574 A1 | 1/2021 | Voicu | |
| 2021/0037110 A1 | 2/2021 | Bennet et al. | |
| 2021/0092154 A1 | 3/2021 | Kumar et al. | |
| 2021/0107164 A1 | 4/2021 | Singh et al. | |
| 2021/0109503 A1 | 4/2021 | Singh et al. | |
| 2021/0109742 A1 | 4/2021 | Bennet et al. | |
| 2021/0110345 A1 | 4/2021 | Iyer et al. | |
| 2021/0117162 A1 | 4/2021 | Thangaraj et al. | |
| 2021/0117302 A1 | 4/2021 | Kadakia et al. | |
| 2021/0117394 A1 | 4/2021 | Moresmau et al. | |
| 2021/0117517 A1 | 4/2021 | Bregman et al. | |
| 2021/0117562 A1 | 4/2021 | Balan et al. | |
| 2021/0117563 A1 | 4/2021 | Moresmau et al. | |
| 2021/0117895 A1 | 4/2021 | Tondevold et al. | |
| 2021/0120044 A1 | 4/2021 | Balan et al. | |
| 2021/0194994 A1 | 6/2021 | Aragón et al. | |
| 2021/0357503 A1 | 11/2021 | Moresmau et al. | |

FOREIGN PATENT DOCUMENTS

| | | |
|---|---|---|
| EP | 3732566 | 11/2020 |
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WG2021076520 A1 | 4/2021 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076521 A1 | 4/2021 |
| WO | WO2021076791 A1 | 4/2021 |
| WO | WO2021076921 A1 | 4/2021 |

OTHER PUBLICATIONS

"International Search Report" and "Written Opinion of the International Searching Authority," Patent Cooperation Treaty Application No. PCT/US2018/056196, dated Dec. 26, 2018, 8 pages.

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"Extended European Search Report" and "Written Opinion", European Application No. 17767331.6, dated Nov. 14, 2019, 6 pages.

"International Search Report" and "Written Opinion of the International Searching Authority," Patent Cooperation Treaty Application No. PCT/US2020/037028, dated Aug. 28, 2020, 13 pages.

"International Search Report" and "Written Opinion of the International Searching Authority," Patent Cooperation Treaty Application No. PCT/US2020/053141, dated Jan. 12, 2021, 8 pages.

"International Search Report" and "Written Opinion of the International Searching Authority," Patent Cooperation Treaty Application No. PCT/US2020/053419, dated Jan. 14, 2021, 14 pages.

"International Search Report" and "Written Opinion of the International Searching Authority," Patent Cooperation Treaty Application No. PCT/US2020/053138, dated Jan. 12, 2021, 8 pages.

"International Search Report" and "Written Opinion of the International Searching Authority," Patent Cooperation Treaty Application No. PCT/US2020/053139, dated Jan. 11, 2021, 8 pages.

"International Search Report" and "Written Opinion of the International Searching Authority," Patent Cooperation Treaty Application No. PCT/US2020/056026, dated Jan. 19, 2021, 16 pages.

"International Search Report" and "Written Opinion of the International Searching Authority," Patent Cooperation Treaty Application No. PCT/US2020/055829, dated Jan. 19, 2021, 18 pages.

"International Search Report" and "Written Opinion of the International Searching Authority," Patent Cooperation Treaty Application No. PCT/US2020/055418, dated Jan. 28, 2021, 8 pages.

"International Search Report" and "Written Opinion of the International Searching Authority," Patent Cooperation Treaty Application No. PCT/US2020/055420, dated Feb. 1, 2021, 8 pages.

Bourgouin et al., "Towards a Process Analysis Approach to Adopt Robotic Process Automation", IEEE, 2018, 8 pages.

"Extended European Search Report" and "Written Opinion", European Application No. 18879227.9, dated Mar. 15, 2021, 9 pages.

\* cited by examiner

METHODS AND SYSTEMS FOR INTEGRATED DEVELOPMENT ENVIRONMENT EDITOR SUPPORT WITH A SINGLE CODE BASE

CROSS REFERENCE TO RELATED APPLICATION

This application claims the priority benefit of U.S. Provisional Patent Application Ser. No. 62/923,151 filed on Oct. 18, 2019 and titled "Methods and Systems for Integrated Development Environment Editor Support with a Single Code Base," which is hereby incorporated by reference in its entirety for all purposes.

FIELD OF INVENTION

The present technology pertains to discovering a unique identifier for an integrated development environment editor. In particular, but not by limitation, discovering a unique identifier for an integrated development environment editor using publicly available tools and published information.

SUMMARY

In some embodiments the present disclosure is directed to a system of one or more computers which can be configured to perform particular operations or actions by virtue of having software, firmware, hardware, or a combination thereof installed on the system that in operation causes or cause the system to perform actions and/or method steps as described herein. An aspect of the present technology relates to a method for discovering a accessing a plug-in registry using publicly available tools and publicly available published information; identifying a unique identifier for an integrated development environment editor using the plug-in registry; and adding the unique identifier for the integrated development environment editor to a plug-in installed in an integrated development environment allowing functions of the plug-in to be available in the integrated development environment.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 10 illustrates a Graphical User Interface (GUI) showing adding a unique identifier for an integrated development environment editor to a plug-in according to exemplary embodiments of the present technology.

FIG. 13 illustrates a Graphical User Interface (GUI) showing adding another integrated development environment according to exemplary embodiments of the present technology.

DETAILED DESCRIPTION

Figure 1:
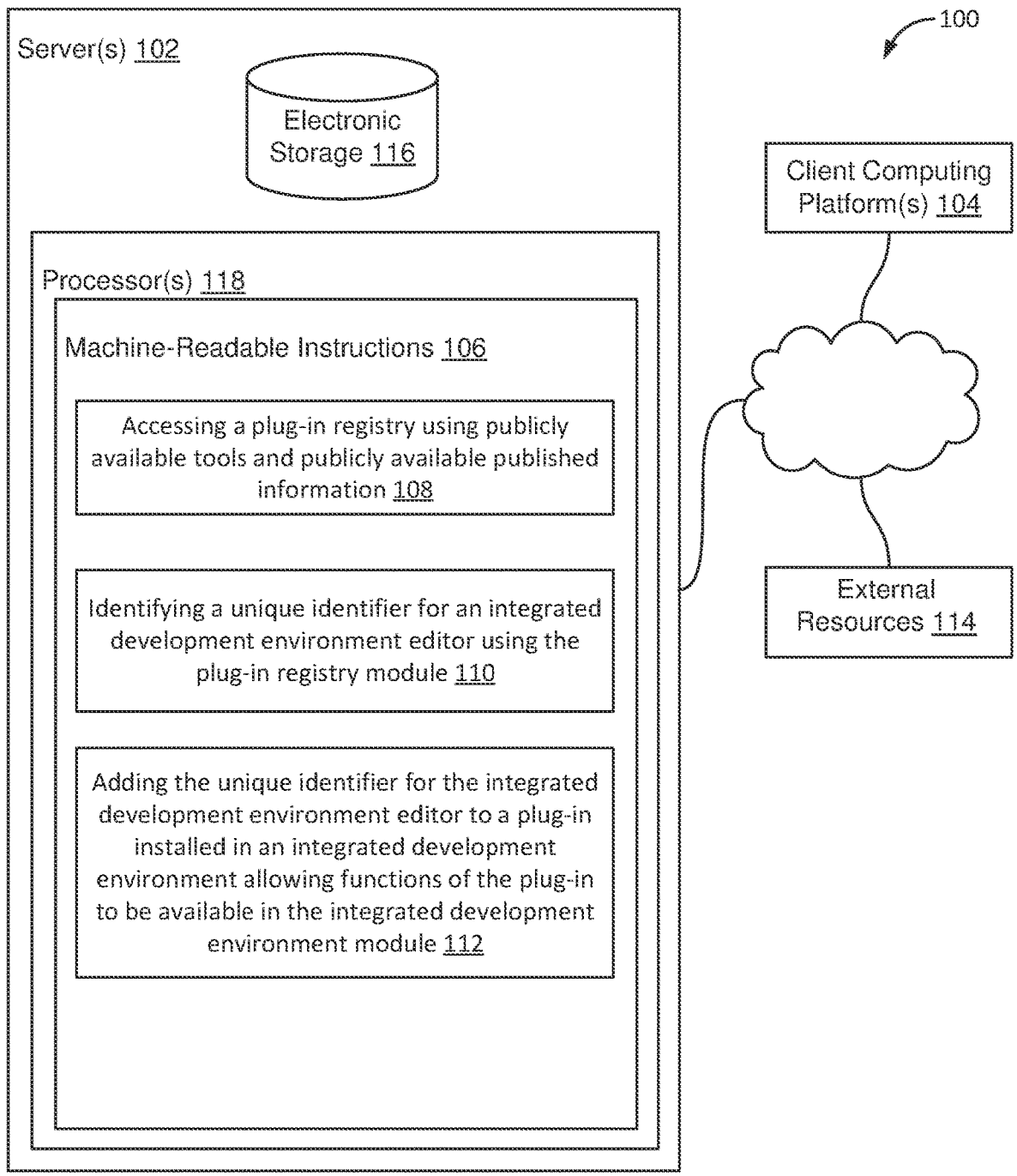
FIG. 1 illustrates a system for discovering a unique identifier for an integrated development environment editor so the integrated development environment editor can be recognized by a plug-in as a recipient of functionality of the plug-in according to exemplary embodiments of the present technology.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

An Integrated Development Environment (IDE), for example Eclipse, is the foundation for multiple commercial products. Various embodiments of the present technology are described using Eclipse as an exemplary IDE although other IDEs may be used with embodiments of the present technology. For example, the exemplary IDE Eclipse provides its own editors for editing files. For instance, making the same end-user function available in these editors provides consistency for both users and the support staff. A problem solved by embodiments of the present technology is to do so with a minimum amount of duplicated or similar code. The present technology provides a solution by providing a single code base that delivers the same functionality to different IDEs with as little development effort as possible.

Eclipse, an exemplary non-limiting IDE, is designed to support software development across a wide range of computing platforms. Based on an open-source, extension-based architecture, Eclipse has served as the foundation for several commercial products, each providing its own editors for editing files. Various embodiments of the present technology provide systems and methods for enhancing a user interface (UI) to provide an plug-in (i.e., add-on) function in an IDE with a single code base offering uniformity in the UI and internal design while keeping development and maintenance cost to a minimum.

For example, any product extending Eclipse with an editor must abide by certain design restrictions. In Eclipse parlance, these are known as extensions, through which Eclipse can control the lifecycle of the editor as well as interactions with Eclipse. One of these extensions identifies the editor by name in the form of a uniform resource identifier (URI). Although not enforced by a central authority, typically these names are unique because they embed the name of the company or the organization.

Eclipse also provides a mechanism through which a piece of add-on software, also known as a plug-in, can make its functions available to other components in Eclipse. The present technology leverages this mechanism to add the same function to different IDEs as descripted herein.

FIG. 1 illustrates a system for discovering a unique identifier for an integrated development environment editor so the integrated development environment editor can be recognized by a plug-in as a recipient of functionality of the plug-in according to exemplary embodiments of the present technology. In some implementations, system 100 may include one or more servers 102. Server(s) 102 may be configured to communicate with one or more client computing platform(s) 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of modules including accessing a plug-in registry using publicly available tools and publicly available published information module 108, identifying a unique identifier for an integrated development environment editor using the plug-in registry module 110, adding the unique identifier for the integrated development environment editor to a plug-in installed in an integrated development environment allowing functions of the plug-in to be available in the integrated development environment module 112, and/or other instruction modules.

In some implementations, server(s) 102, client computing platform(s) 104, and/or external resources 114 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 114 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 114, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms such as the computing platform described in FIG. 15.

External resources 114 may include sources of information outside of system 100, external entities participating with system 100, and/or other resources. In some implementations, some or all of the functionality attributed herein to external resources 114 may be provided by resources included in system 100.

Server(s) 102 may include electronic storage 116, one or more processors 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may comprise non-transitory storage media that electronically stores information. The electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platform(s) 104, and/or other information that enables server(s) 102 to function as described herein.

Processor(s) 118 may be configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 108, 110, and/or 112, and/or other modules. Processor(s) 118 may be configured to execute modules 108, 110, and/or 112, and/or other modules by software; hardware; firmware; some combination of software, hardware, and/or firmware; and/or other mechanisms for configuring processing capabilities on processor(s) 118. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, and/or 112, are illustrated in FIG. 1 as being implemented within a single processing unit, in implementations in which processor(s) 118 includes multiple processing units, one or more of modules 108, 110, and/or 112, may be implemented remotely from the other modules. The description of the functionality provided by the different modules 108, 110, and/or 112, described below is for illustrative purposes, and is not intended to be limiting, as any of modules 108, 110, and/or 112, may provide more or less functionality than is described. For example, one or more of modules 108, 110, and/or 112, may be eliminated, and some or all of its functionality may be provided by other ones of modules 108, 110, and/or 112. As another example, processor(s) 118 may be configured to execute one or more additional modules that may perform some or all of the functionality attributed below to one of modules 108, 110, and/or 112.

Figure 2:
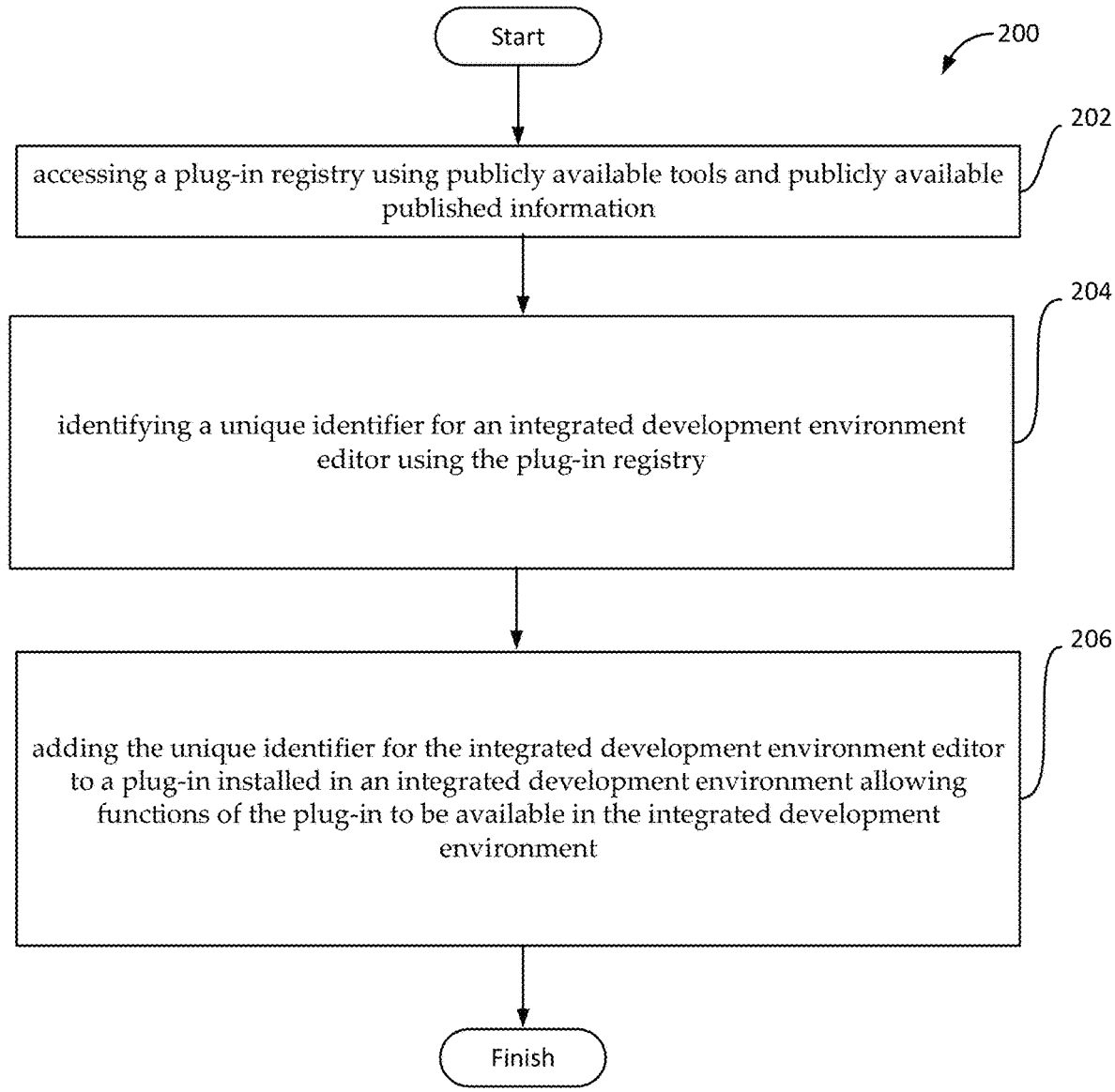
FIG. 2 illustrates an exemplary flow chart for discovering a unique identifier for an integrated development environment editor so the integrated development environment editor can be recognized by a plug-in as a recipient of functionality of the plug-in according to exemplary embodiments of the present technology.

FIG. 2 illustrates an exemplary flow chart for discovering a unique identifier for an integrated development environment editor so the integrated development environment editor can be recognized by a plug-in as a recipient of functionality of the plug-in according to exemplary embodiments of the present technology. The steps of flow chart 200 presented below are intended to be illustrative. In some implementations, flow chart 200 may be accomplished with one or more additional steps not described, and/or without one or more of the steps discussed. Additionally, the order in which the steps of flow chart 200 are illustrated in FIG. 2 and described below is not intended to be limiting.

In some implementations, flow chart 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the steps of flow chart 200 in response to instructions stored electronically on an electronic storage medium (e.g., electronic storage 116). The one or more processing devices may include one or more devices configured through hardware, firmware, and/or software to be specifically designed for execution of one or more of the steps of flow chart 200.

A step 202 may include accessing a plug-in registry using publicly available tools and publicly available published information. Step 202 may be performed by one or more hardware processors configured by machine-readable instructions including a module that is the same as or similar to accessing a plug-in registry using publicly available tools and publicly available published information module 108, in accordance with one or more implementations.

A step 204 may include identifying a unique identifier for an integrated development environment editor using the plug-in registry. Step 204 may be performed by one or more hardware processors configured by machine-readable instructions including a module that is the same as or similar to identifying a unique identifier for an integrated development environment editor using the plug-in registry module 110, in accordance with one or more implementations.

A step 206 may include adding the unique identifier for the integrated development environment editor to a plug-in allowing functions of the plug-in to be available in the integrated development environment. Step 206 may be performed by one or more hardware processors configured by machine-readable instructions including a module that is the same as or similar to adding the unique identifier for the integrated development environment editor to a plug-in allowing functions of the plug-in to be available in the integrated development environment module 112, in accordance with one or more implementations.

Eclipse is an exemplary, non-limiting IDE that is used with embodiments of the present technology described herein and also provides a mechanism through which a piece of add-on software, also known as a plug-in, can make its functions available to other components in Eclipse. The present technology leverages this mechanism to add the same function to different editors as follows below.

Identify the editors in which the function should be made available.

Collect the unique identifiers of these editors.

Identify the locations where the function should appear in the user interface. For example, a function may appear in the toolbar, a drop-down menu, or a pop-up menu.

To add a function to a drop-down menu, add a menu contribution section to the plug-in's definition file. A user may specify the command that will get control when the menu is selected.

The command specification syntax also allows the specification of when the command is visible. To support multiple editors, the visibility section may start with an OR operator, followed by a list of expressions identifying which editors meet the condition for displaying the command.

Another section in the plug-in's definition file associates a command to the actual code that handles the command. Given the visibility section defined in the previous step, all the editors in the list would invoke the same command when its menu item is selected, thus invoking the same code to handle the command.

The process to add a function to a toolbar or a pop-up menu is similar, the only difference being the location specified in the menu contribution as a user may specify the command that will get control when the menu is selected as described above.

In various embodiments, a novel aspect of the present technology is the sub-steps that an Eclipse editor's unique identifier is discovered using publicly available tools and published information. The sub-steps are as follows:

I. Start the Eclipse-based product containing the editor to be supported.

II. From the menu, select Window→Show View→Other . . . to display a list of views available.

III. In the list of views, expand the folder named Plug-in Development. See Installing Plug-in Development Tools section if this folder is not available in the list.

IV. From the Plug-in Development folder, select Plug-in Registry and click OK.

V. The Plug-in Registry view will be displayed, showing a list of plug-ins installed with the product. Scan the list for the plug-in that represents the editor in question. See Tips for Identifying Editor Plug-in section for more details.

VI. Expand the plug-in by clicking the arrow (>) to the left of the plug-in's name.

VII. Expand the Extensions item.

VIII. Expand the org.eclipse.ui.editors item.

IX. Expand the editor item.

X. There will be an item named id=<some identifier>. This is the editor's ID to be used in the plug-in's definition file, mentioned above (To add a function to a drop-down menu, add a menu contribution section to the plug-in's definition file.) An easy way to copy this identifier is to select the item and press Ctrl-C, then paste into another file using Ctrl-V.

In various embodiments, the sub-steps of the present technology (e.g., sub-steps I-X above) work because any editor that plugs into the Eclipse workbench must meet the interface requirements for org.eclipse.ui.editors. The interface must be published to the Plug-in Registry. The sub-steps of the present technology recognize that the plug-in registry can be accessed easily using a publicly available tool; the information accessed is published, and no reverse engineering is necessary, and the steps to access the information are documented and repeatable.

Installing plug-in development tools is described according to various embodiments of the present technology. The process documented herein relies on plug-in development tools that are a part of the Eclipse inventory as an exemplary IDE. However, not all products based on Eclipse will include the plug-in development tools in their basic installation. To install the plug-in development tools a user may complete the following:

1. Select Help→About Product from the menu.

2. The product identification information should contain the Eclipse version the product is based on. Write down the first two parts in this version number. For example, if the version number is 4.6.3, then record just 4.6.

3. Select Help→Install New Software . . .

4. Enter http://download.eclipse.org/eclipse/updates/version in the Work with box, where version is the portion of version number recorded in Step 2. Click Add.

5. The Location box should have been filled in with the link from the previous window. Enter a name such as Eclipse update site in the Name box. Click Add.

6. Eclipse will retrieve a list of packages available for install. Select the one named Eclipse Plugin Development Tools by clicking the box in front of the name. Depending on the Eclipse version, the name may be slightly different.

7. Click Next to start the installation process.

The Plug-in Development folder and the Plug-in Registry view may be available in the list of views after the installation of plug-in development tools.

In various embodiments of the present technology, knowing which plug-in in the plug-in registry represents the editor to be supported can be a challenge, as the list of plug-ins can contain hundreds of items. An easy way to identify which plug-in may embody the editor in question is to look for something that looks like com.companyname.productname.editors.filetype, where:

companyname is the name of the company that developed the product.

productname is the name of the product.

filetype is the type of files supported by the editor.

Although this format may not be universally adopted, it is a convention followed closely by most product companies in the Eclipse community.

In various embodiments a unique IDE identifier may be used in another IDE. Thus, a unique IDE identifier may be used in multiple IDE. In various embodiments, steps described above provide the basic procedure for updating a plug-in definition file to allow the same function to appear in multiple editors. The following is an excerpt from an actual definition file, serving as an example for various embodiments:

```
<extension point="org.eclipse.ui.menus">
    <menuContribution
        allPopups="false"
        locationURI="menu:edit?after=selectAll">
    <command
        commandId="com.asg.systems.projcl.commands.scanjcl"
        id="com.asg.systems.projcl.menus.scanjcl"
        label="Scan JCL"
        style="push">
    <visibleWhen checkEnabled="false">
        <or>
            <with variable="activeEditorId">
                <equals
                    value="org.eclipse.ui.DefaultTextEditor">
                </equals>
            </with>
            <with variable="activeEditorId">
                <equals
                    value="com.compuware.topaz.editors.JCLEditor">
                </equals>
            </with>
        </or>
    </visibleWhen>
    </command>
    </menuContribution>
</extension>
```

In this example, the two editors that share the same command are identified by:
   org.eclipse.ui.DefaultTextEditor
   com.compuware.topaz.editors.JCLEditor as indicated by the two lines starting with the word "value".

Figure 3:
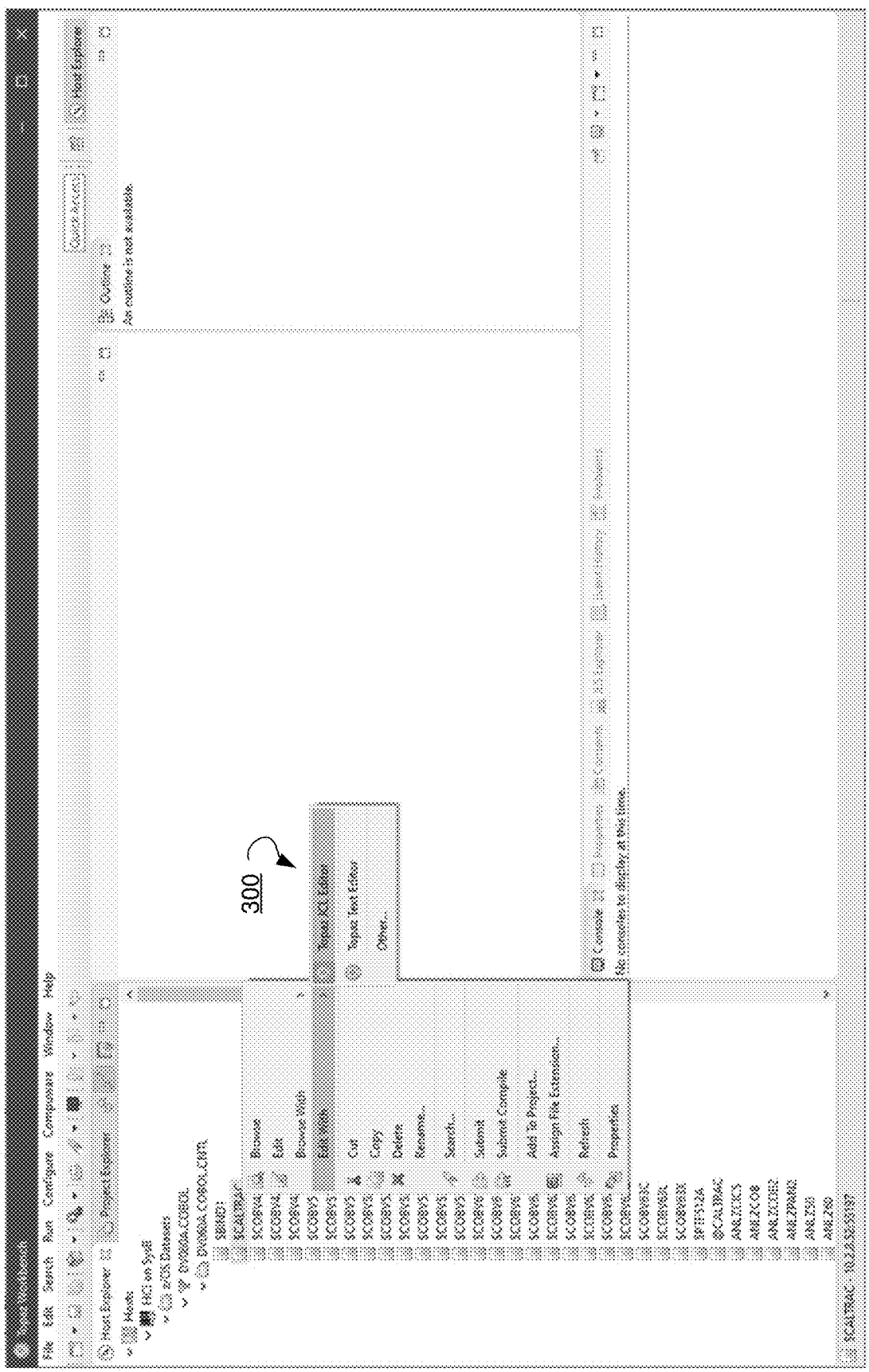
FIG. 3 illustrates a Graphical User Interface (GUI) showing selection of an integrated development environment editor according to exemplary embodiments of the present technology.
Figure 13:
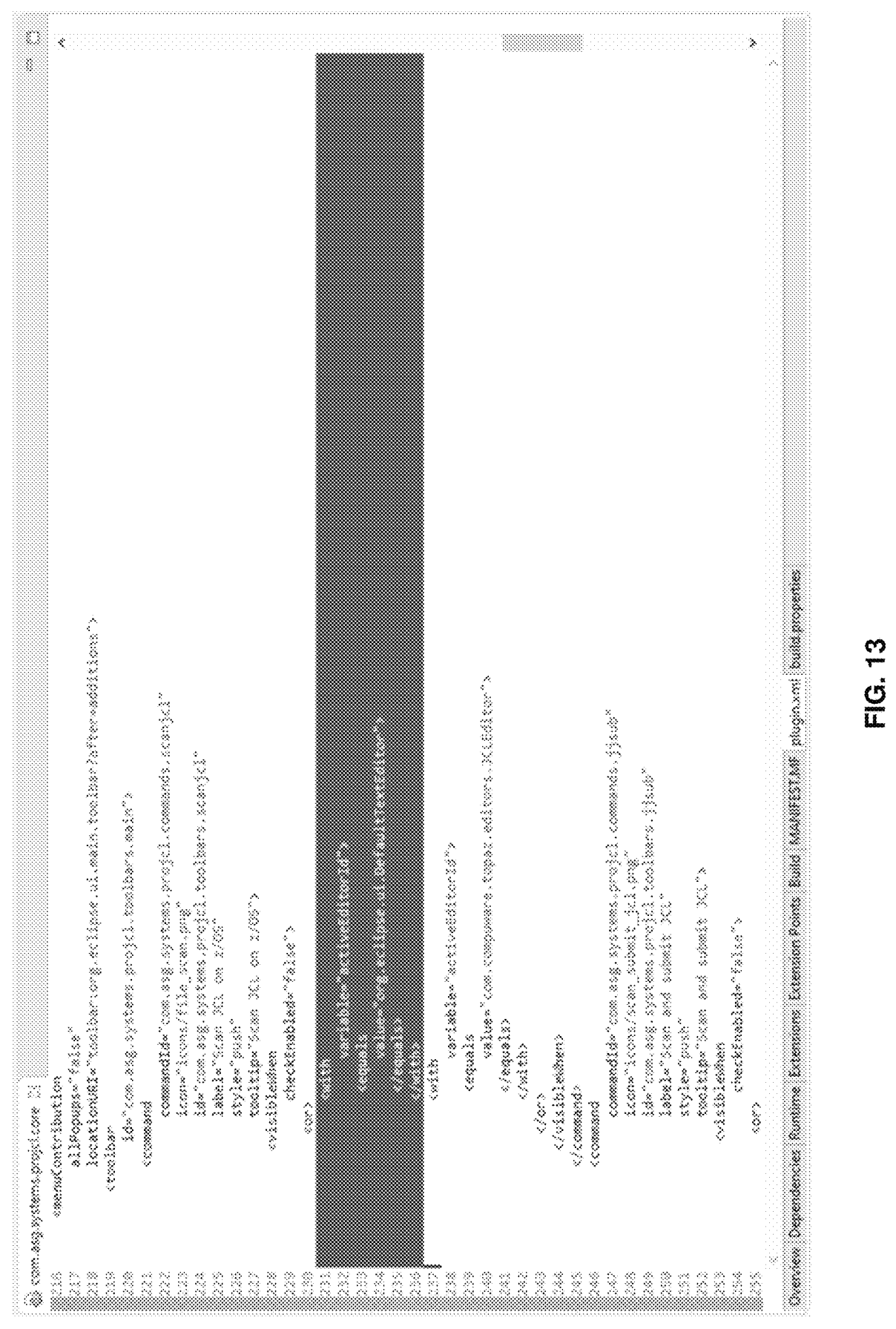

Turning to FIG. 3 though FIG. 13 that show an exemplary specific use case according to various embodiments of systems and methods for discovering a unique identifier for an integrated development environment editor so the integrated development environment editor can be recognized by a plug-in as a recipient of functionality of the plug-in.

FIG. 3 illustrates a Graphical User Interface (GUI) showing selection of an integrated development environment editor according to exemplary embodiments of the present technology. For example, selection of a Topaz Editor 300 for editing Job Control Language (JCL) for scripting languages used on IBM mainframe operating systems is shown in FIG. 3.

Figure 4:
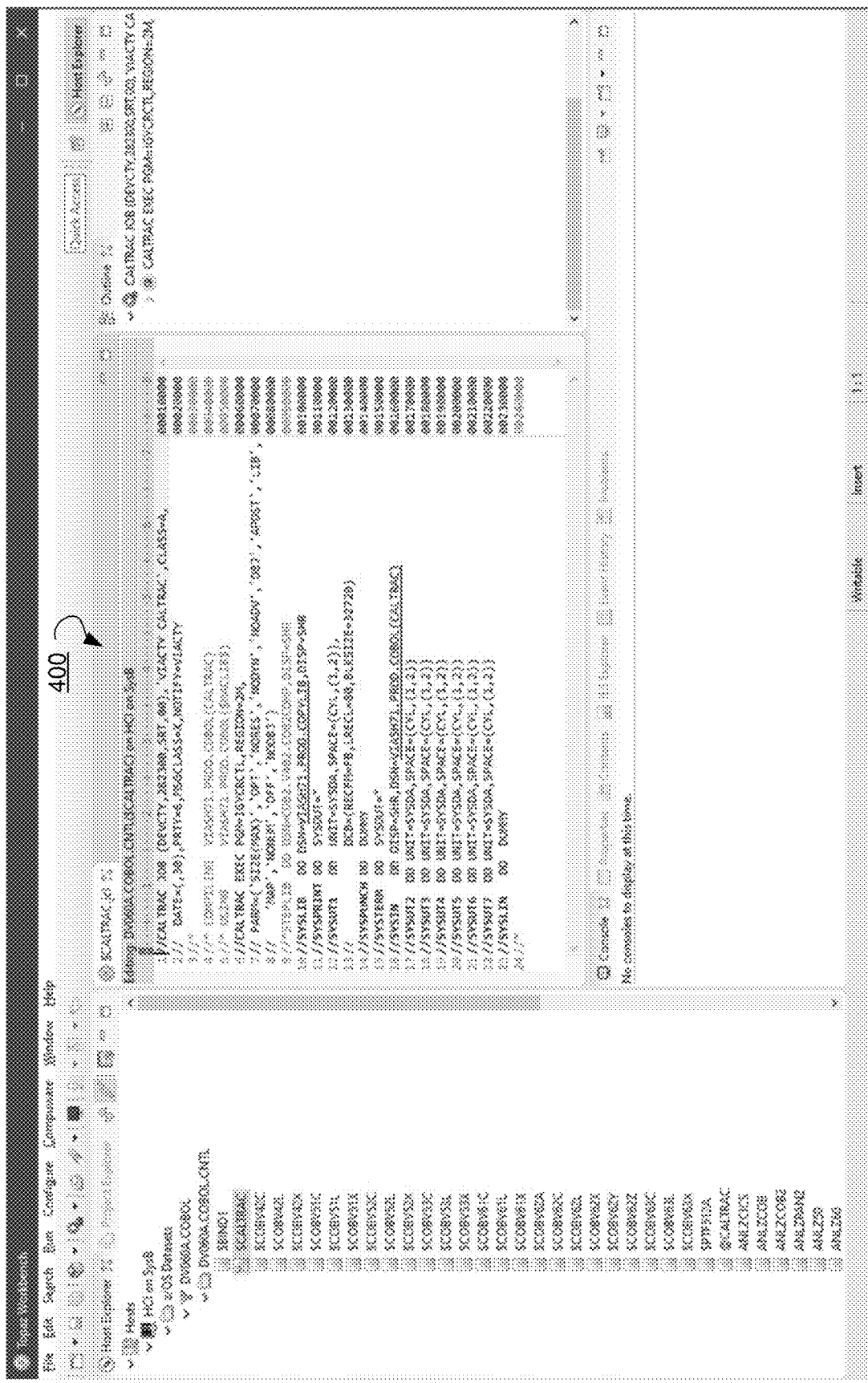
FIG. 4 illustrates a Graphical User Interface (GUI) showing selection 400 of a project for an integrated development environment editor according to exemplary embodiments of the present technology.

FIG. 4 illustrates a Graphical User Interface (GUI) showing selection 400 of a project for an integrated development environment editor according to exemplary embodiments of the present technology.

Figure 5:
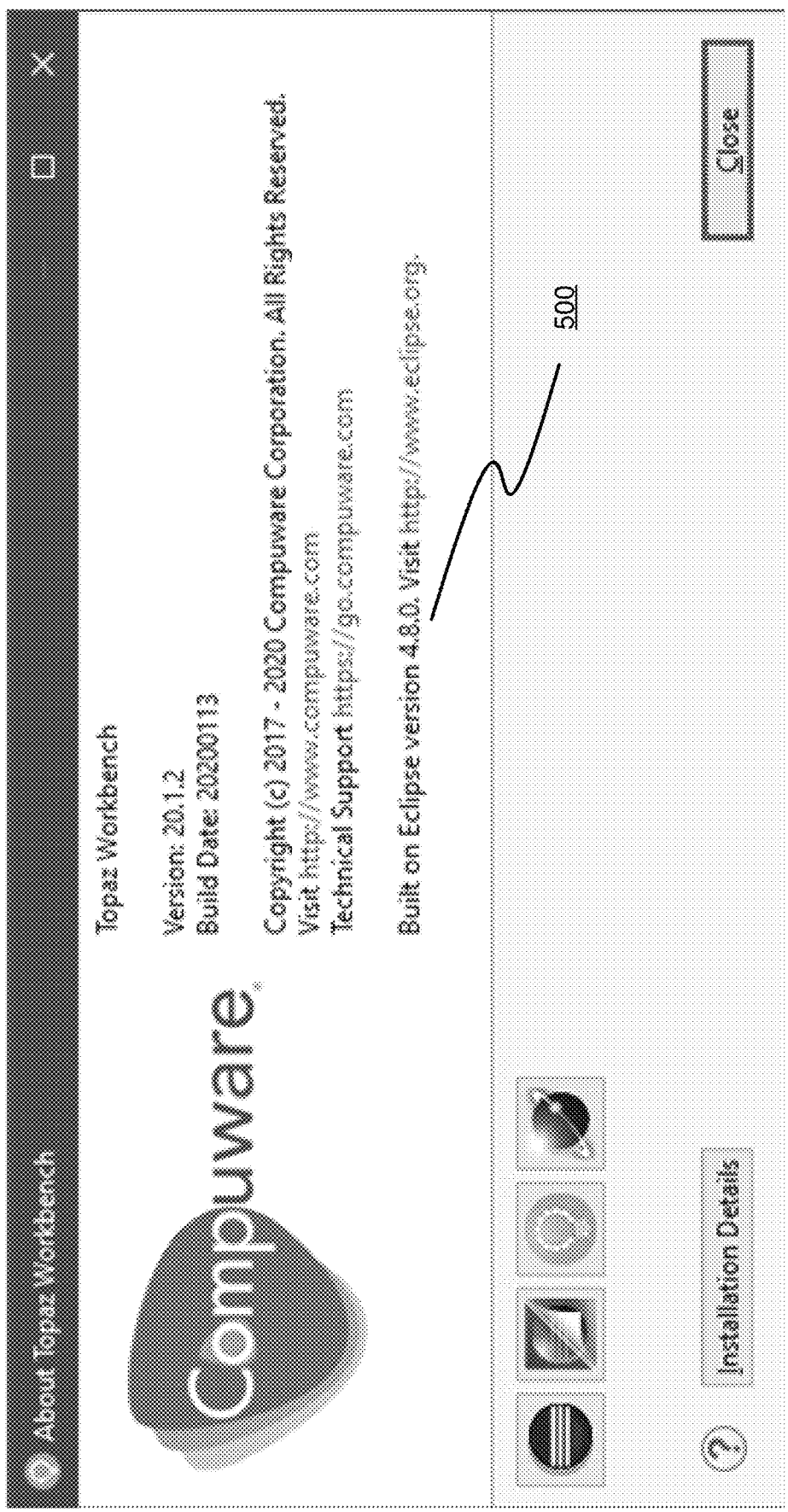
FIG. 5 illustrates a Graphical User Interface (GUI) showing a version of an integrated development environment editor according to exemplary embodiments of the present technology.

FIG. 5 illustrates a Graphical User Interface (GUI) showing a version of an integrated development environment editor according to exemplary embodiments of the present technology. For example, version 4.8.0 of Eclipse 500 shown in FIG. 5.

Figure 6:
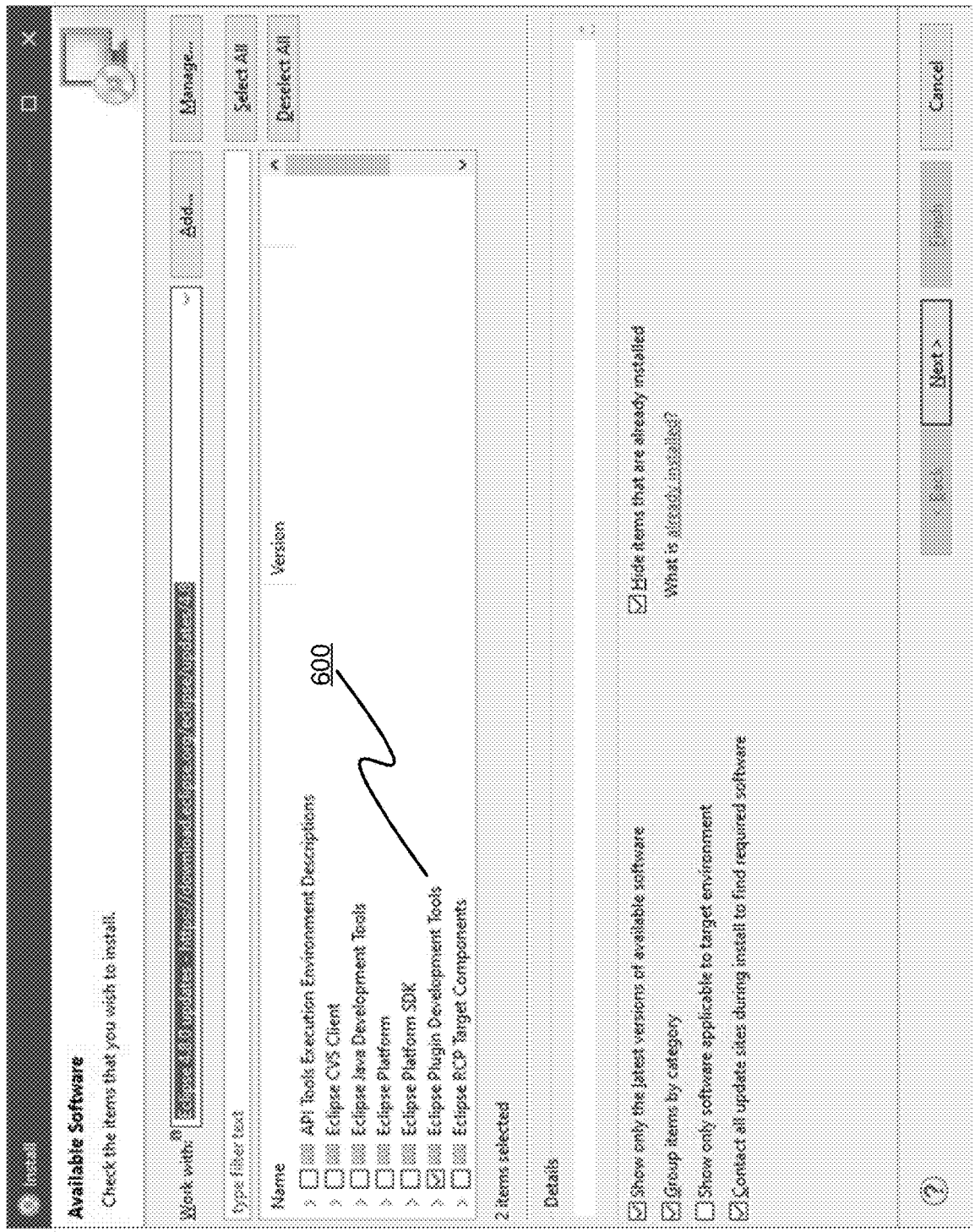
FIG. 6 illustrates a Graphical User Interface (GUI) showing selection of plug-in development tools according to exemplary embodiments of the present technology.

FIG. 6 illustrates a Graphical User Interface (GUI) showing selection of plug-in development tools according to exemplary embodiments of the present technology. For example, selecting Eclipse plug-in development tools 600 is shown in FIG. 6.

Figure 7:
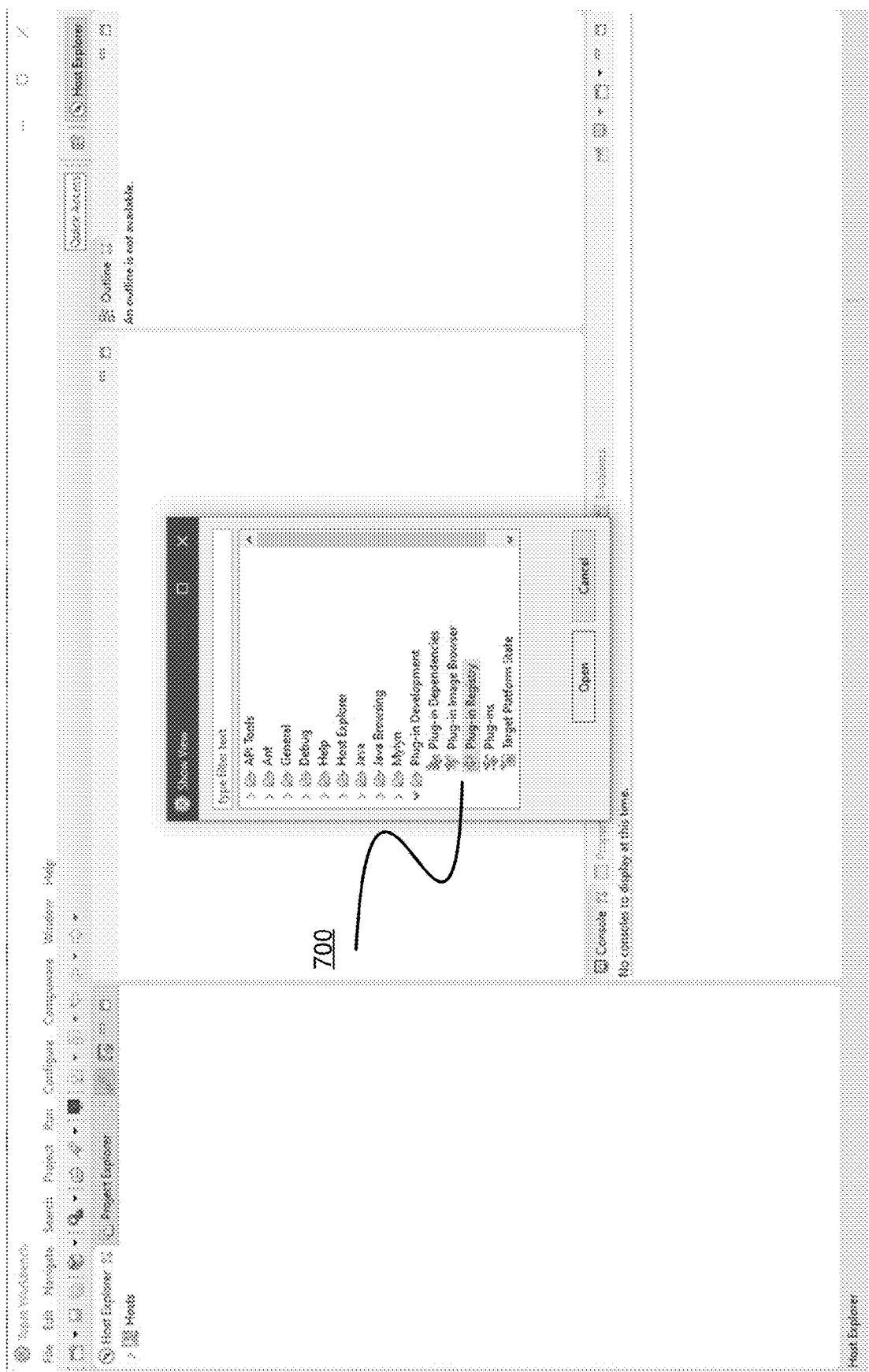
FIG. 7 illustrates a Graphical User Interface (GUI) showing opening of a plug-in registry according to exemplary embodiments of the present technology.

FIG. 7 illustrates a Graphical User Interface (GUI) showing opening of a plug-in registry according to exemplary embodiments of the present technology. For example, opening plug-in registry 700 is shown in FIG. 7.

Figure 8:
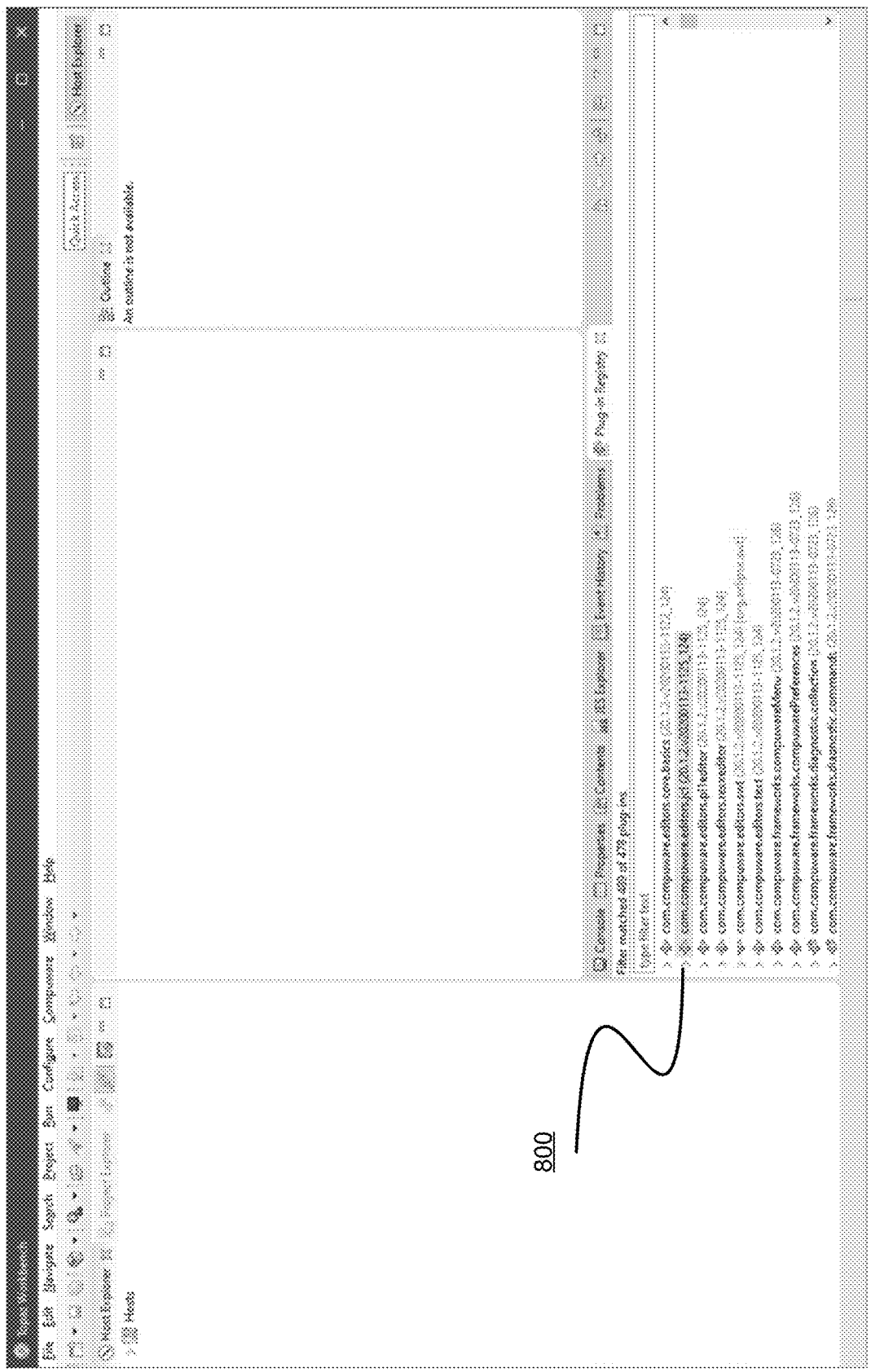
FIG. 8 illustrates a Graphical User Interface (GUI) showing locating an integrated development environment editor in a plug-in registry according to exemplary embodiments of the present technology.

FIG. 8 illustrates a Graphical User Interface (GUI) showing locating an integrated development environment editor in a plug-in registry according to exemplary embodiments of the present technology. For example, locating an integrated development environment editor in a plug-in registry 800 is shown in FIG. 8.

Figure 9:
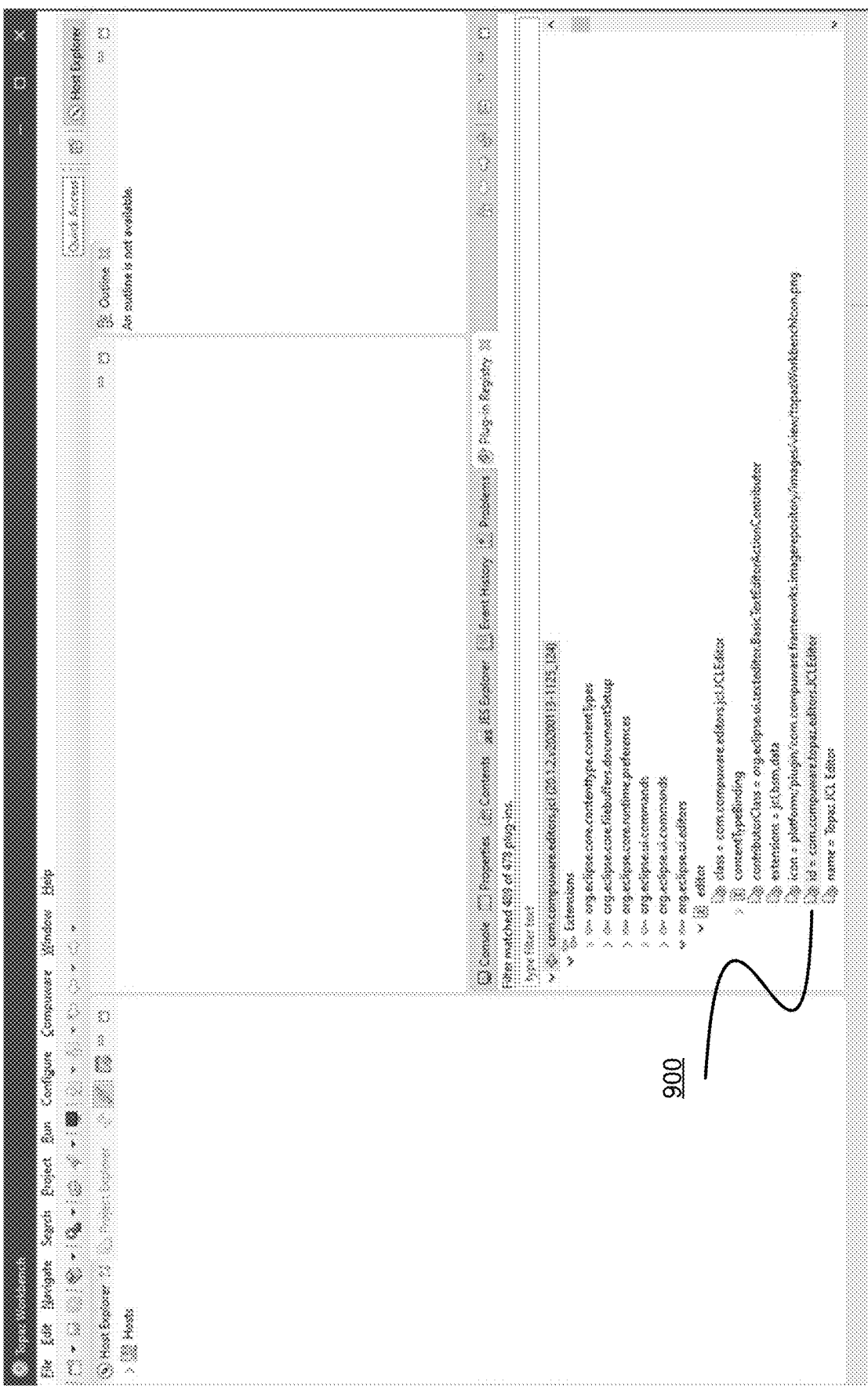
FIG. 9 illustrates a Graphical User Interface (GUI) showing identifying a unique identifier for an integrated development environment editor according to exemplary embodiments of the present technology.

FIG. 9 illustrates a Graphical User Interface (GUI) showing identifying a unique identifier for an integrated development environment editor according to exemplary embodiments of the present technology. For example, identifying a unique identifier 900 for an integrated development environment is shown in FIG. 9. For instance, the unique identifier 900 for an integrated development environment is an item named id=<some identifier>, which is the unique identifier for an integrated development environment editor that is used in a definition file of the plug-in. The unique identifier 900 for an integrated development environment is id="com.compuware.topaz.editors.JCLEditor" as shown in FIG. 9.

FIG. 10 illustrates a Graphical User Interface (GUI) showing adding a unique identifier for an integrated development environment editor to a plug-in according to exemplary embodiments of the present technology. For instance, the unique identifier for an integrated development environment "com.compuware.topaz.editors.JCLEditor" 1000 is shown being added to the plug-in as shown in FIG. 10.

Figure 11:
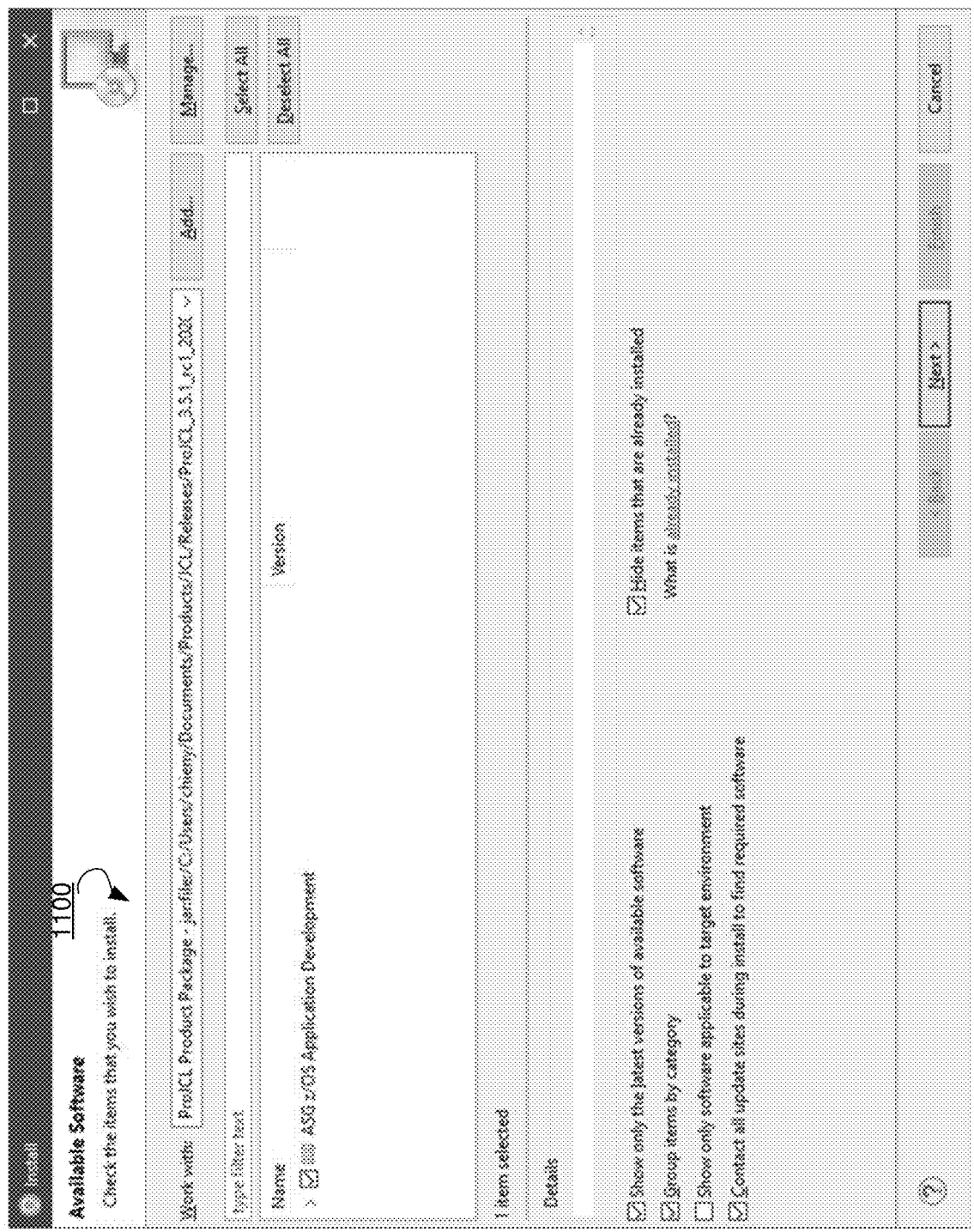
FIG. 11 illustrates a Graphical User Interface (GUI) showing installing a plug-in according to exemplary embodiments of the present technology.

FIG. 11 illustrates a Graphical User Interface (GUI) showing installing a plug-in according to exemplary embodiments of the present technology. For example, installing the plug-in 1100 with the unique identifier for an integrated development environment "com.compuware.topaz.editors.JCLEditor" is shown in FIG. 11.

Figure 12:
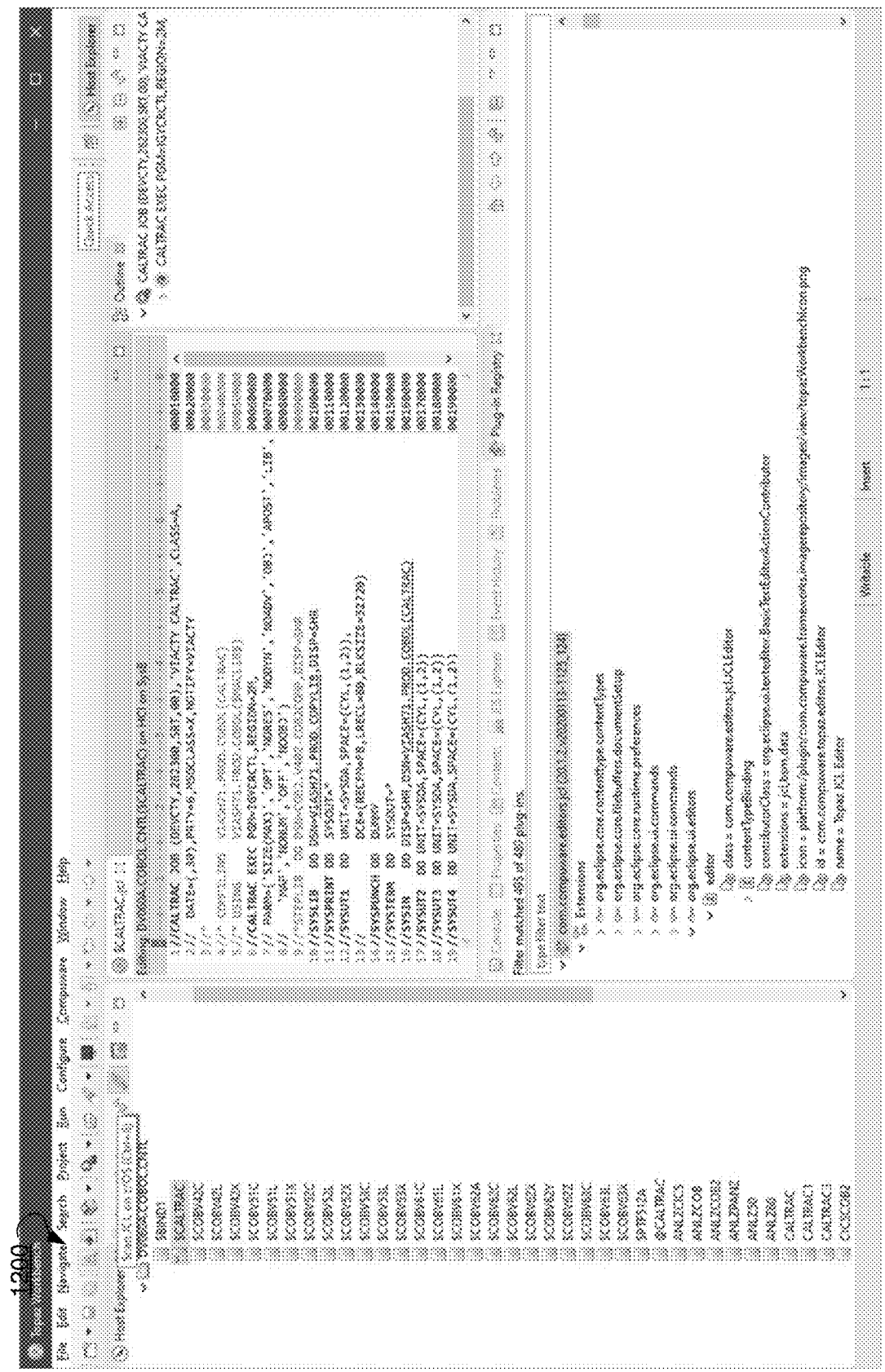
FIG. 12 illustrates a Graphical User Interface (GUI) showing functions of a plug-in available in an integrated development environment according to exemplary embodiments of the present technology.

FIG. 12 illustrates a Graphical User Interface (GUI) showing functions of a plug-in available in an integrated development environment according to exemplary embodiments of the present technology. As a result of adding the unique identifier for an integrated development environment to the plug-in, functions of the plug-in are available in an integrated development environment as shown in FIG. 12. The two extra buttons 1200 (one button looks like a magnifying glass over a sheet of paper and the other button is a sheet of paper with a red arrow over it on the left side). The two extra buttons 1200 in FIG. 12 are not present in FIG. 4, indicating that the newly installed plug-in recognizes the integrated development environment editor because the unique identifier of the integrated development environment editor has been provided to the plug-in allowing functions of the plug-in to be available in the integrated development environment.

FIG. 13 illustrates a Graphical User Interface (GUI) showing adding another integrated development environment according to exemplary embodiments of the present technology.

Figure 14:
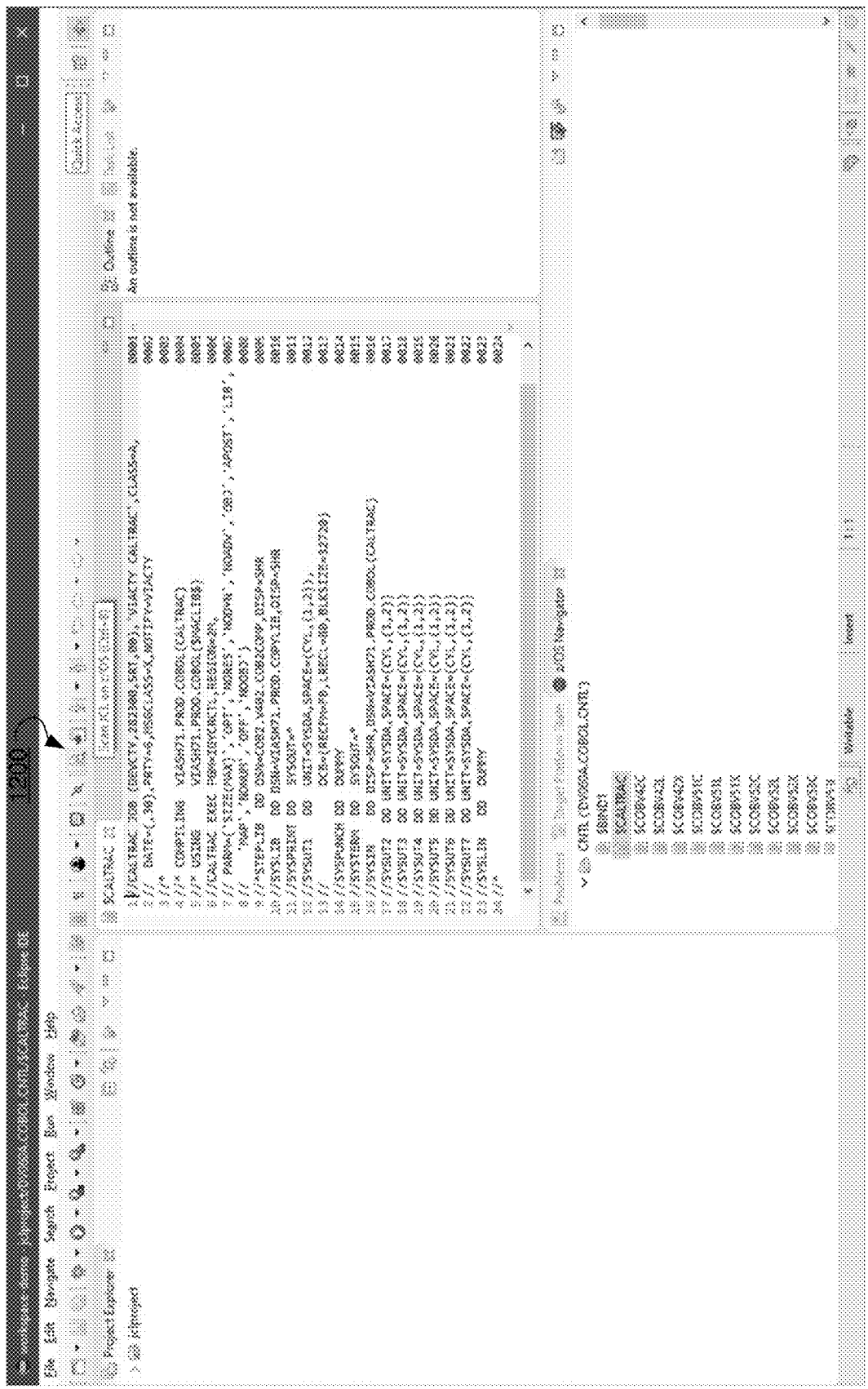
FIG. 14 illustrates a Graphical User Interface (GUI) showing the same plug-in is available in another integrated development environment according to exemplary embodiments of the present technology.

FIG. 14 illustrates a Graphical User Interface (GUI) showing the same plug-in is available in another integrated development environment according to exemplary embodiments of the present technology. FIG. 14 shows that the two extra buttons 1200 (one button looks like a magnifying glass over a sheet of paper and the other button is a sheet of paper with a red arrow over it on the left side) shown in FIG. 12 now appear in FIG. 14 in a different location in the Graphical User Interface (GUI). For example, FIG. 14 shows the two extra buttons 1200 in the center of the toolbar, above the box with the text "Scan JCL on z/OS."). The presence of two extra buttons 1200 in the Graphical User Interface (GUI) is an indication that the same plug-in now appears in another integrated development environment editor (i.e., a second integrated development environment) allowing functions of the plug-in to be available in the another integrated development environment editor (i.e., a second integrated development environment).

Figure 15:
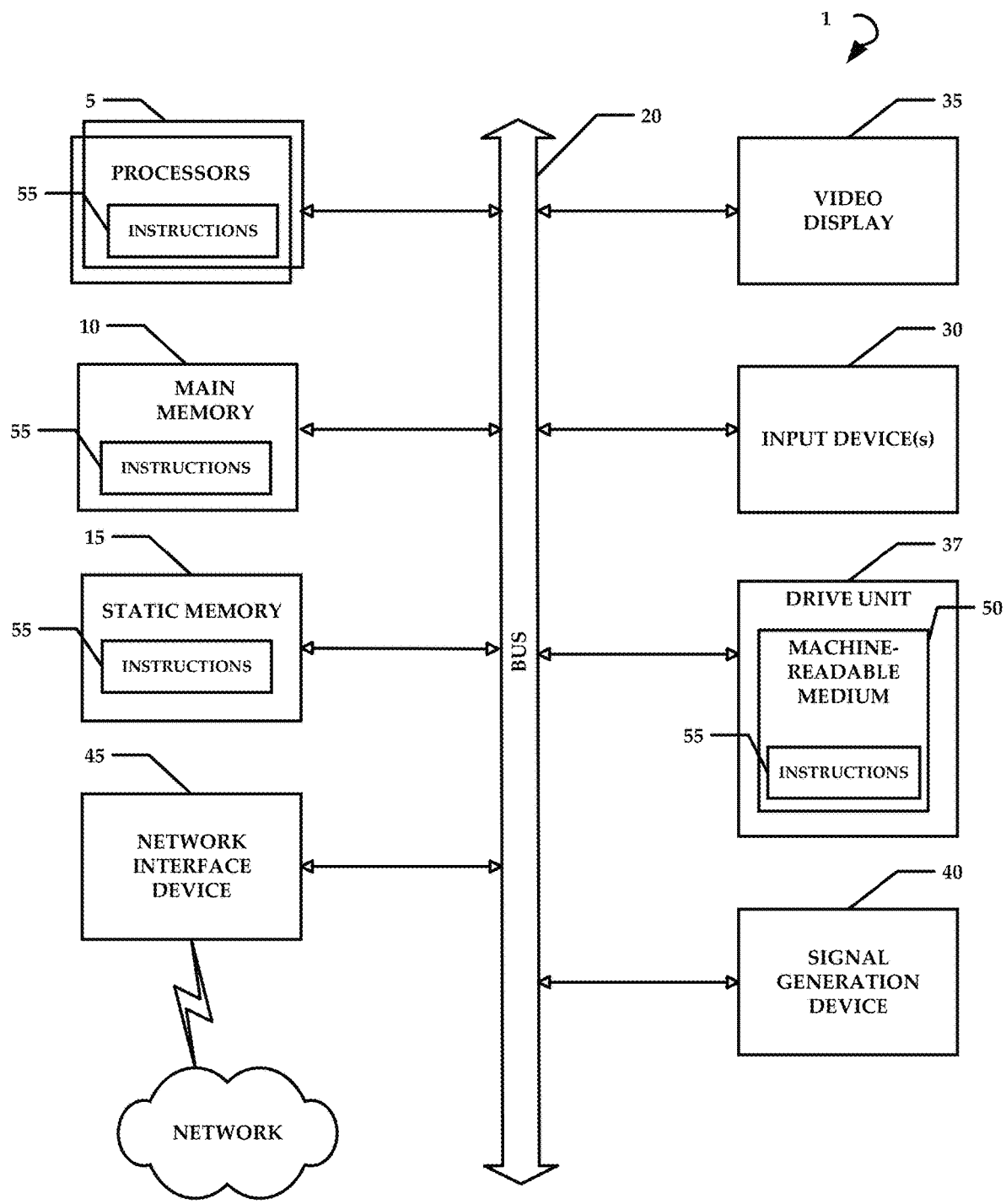
FIG. 15 illustrates a computer system for implementing embodiments according to exemplary embodiments of the present technology.

FIG. 15 illustrates a computer system for implementing embodiments according to exemplary embodiments of the present technology. FIG. 15 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the description, for purposes of explanation and not limitation, specific details are set forth, such as particular embodiments, procedures, techniques, and so forth, in order to provide a thorough understanding of the present technology. However, it will be apparent to one skilled in the art that the present technology may be practiced in other embodiments that depart from these specific details.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the present technology to the particular forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A method for discovering a unique identifier for an integrated development environment editor so the integrated development environment editor can be recognized by a plug-in as a recipient of functionality of the plug-in, the method comprising:
    accessing a plug-in registry using publicly available tools and publicly available published information;
    identifying a unique identifier for an integrated development environment editor using the plug-in registry; and
    adding the unique identifier for the integrated development environment editor to a plug-in installed in an integrated development environment allowing functions of the plug-in to be available to the integrated development environment editor in the integrated development environment, wherein the functions of the plug-in are available for being invoked, from a code base, by a plurality of integrated development environment editors associated with the integrated development environment, the integrated development environment editor being one of the plurality of integrated development environment editors.

2. The method of claim 1, further comprising:
  identifying a function for addition to a Graphical User Interface (GUI) of the integrated development environment;
  receiving a placement location on the Graphical User Interface (GUI) of the integrated development environment for the function; and
  adding the function to the placement location on the Graphical User Interface (GUI) of the integrated development environment.

3. The method of claim 2, wherein the placement location on the Graphical User Interface (GUI) of the integrated development environment is at least one of a toolbar, a drop-down menu, and a pop-up menu.

4. The method of claim 1, wherein identifying a unique identifier for the integrated development environment editor using the plug-in registry comprises:
  selecting a list of views available; and
  expanding a plug-in development tool.

5. The method of claim 1, wherein the integrated development environment is Eclipse.

6. The method of claim 1, wherein the integrated development environment comprises:
  a source code editor.

7. The method of claim 6, wherein the integrated development environment further comprises:
  a build automation tool;
  a debugger;
  a compiler; and
  an interpreter.

8. The method of claim 7, wherein the integrated development environment further comprises:
  a class browser;
  an object browser; and
  a class hierarchy diagram.

9. The method of claim 1, further comprising:
  identifying a unique identifier for a second integrated development environment editor of the plurality of integrated development environment editors using the plug-in registry; and
  adding the unique identifier for the second integrated development environment editor to the plug-in installed in the integrated development environment allowing functions of the plug-in to be available to the second integrated development environment editor in the integrated development environment.

10. The method of claim 9, further comprising:
  identifying a unique identifier for a further integrated development environment editor of the plurality of integrated development environment editors using the plug-in registry; and
  adding the unique identifier for the further integrated development environment editor to the plug-in installed in the integrated development environment allowing functions of the plug-in to be available to the further integrated development environment editor in the integrated development environment.

11. A system configured for discovering a unique identifier for an integrated development environment editor so the integrated development environment editor can be recognized by a plug-in as a recipient of functionality of the plug-in, the system comprising:
  one or more hardware processors configured by machine-readable instructions to:
    access a plug-in registry using publicly available tools and publicly available published information;
    identify a unique identifier for an integrated development environment editor using the plug-in registry; and
    add the unique identifier for the integrated development environment editor to a plug-in installed in an integrated development environment allowing functions of the plug-in to be available to the integrated development environment editor in the integrated development environment, wherein the functions of the plug-in are available for being invoked, from a code base, by a plurality of integrated development environment editors associated with the integrated development environment, the integrated development environment editor being one of the plurality of integrated development environment editors.

12. The system of claim 11, wherein the one or more hardware processors are further configured by machine-readable instructions to:
  identify a function for addition to a Graphical User Interface (GUI) of the integrated development environment;
  receive a placement location on the Graphical User Interface (GUI) of the integrated development environment for the function; and
  add the function to the placement location on the Graphical User Interface (GUI) of the integrated development environment.

13. The system of claim 12, wherein the placement location on the Graphical User Interface (GUI) of the integrated development environment is at least one of a toolbar, a drop-down menu, and a pop-up menu.

14. The system of claim 11, wherein identifying the unique identifier for the integrated development environment editor using the plug-in registry comprises:
  selecting a list of views available; and
  expanding a plug-in development tool.

15. The system of claim 11, wherein the integrated development environment is Eclipse.

16. The system of claim 11, wherein the integrated development environment comprises:
  a source code editor.

17. The system of claim 11, wherein the one or more hardware processors are further configured by machine-readable instructions to:
  identify a unique identifier for a second integrated development environment editor of the plurality of integrated development environment editors using the plug-in registry; and
  add the unique identifier for the second integrated development environment editor to the plug-in installed in the integrated development environment allowing functions of the plug-in to be available to the second integrated development environment editor in the integrated development environment.

18. The system of claim 17, wherein the one or more hardware processors are further configured by machine-readable instructions to:
  identify a unique identifier for a further integrated development environment editor of the plurality of integrated development environment editors using the plug-in registry; and
  add the unique identifier for the further integrated development environment editor to the plug-in installed in the integrated development environment allowing functions of the plug-in to be available to the further integrated development environment editor in the integrated development environment.

19. A non-transient computer-readable storage medium having instructions embodied thereon, the instructions being executable by one or more processors to perform operations for discovering a unique identifier for an integrated development environment editor so the integrated development environment editor can be recognized by a plug-in as a recipient of functionality of the plug-in, the operations comprising:

accessing a plug-in registry using publicly available tools and publicly available published information;

identifying a unique identifier for an integrated development environment editor using the plug-in registry; and adding the unique identifier for the integrated development environment editor to a plug-in installed in an integrated development environment allowing functions of the plug-in to be available to the integrated development environment editor in the integrated development environment, wherein the functions of the plug-in are available for being invoked, from a code base, by a plurality of integrated development environment editors associated with the integrated development environment, the integrated development environment editor being one of the plurality of integrated development environment editors.

20. The non-transient computer-readable storage medium of claim 19, wherein the operations further comprise:

identifying a function for addition to a Graphical User Interface (GUI) of the integrated development environment;

receiving a placement location on the Graphical User Interface (GUI) of the integrated development environment for the function; and adding the function to the placement location on the Graphical User Interface (GUI) of the integrated development environment.

\* \* \* \* \*